Sept. 21, 1971     E. T. CLARK     3,606,723
METHOD AND APPARATUS FOR HARVESTING AND HANDLING CROPS
Filed April 10, 1969     5 Sheets-Sheet 1
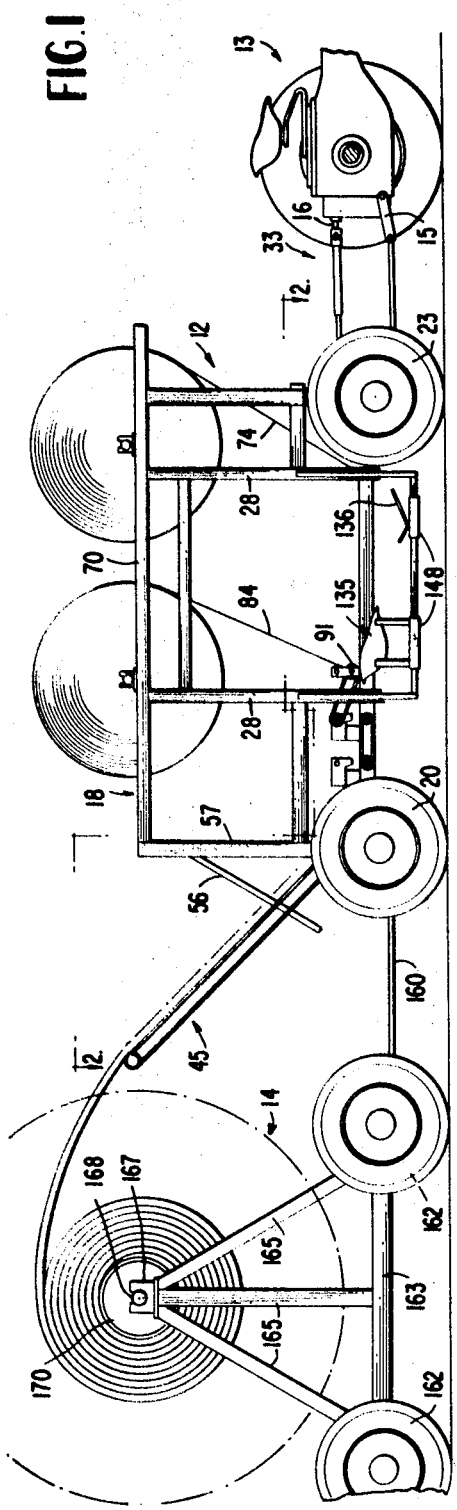
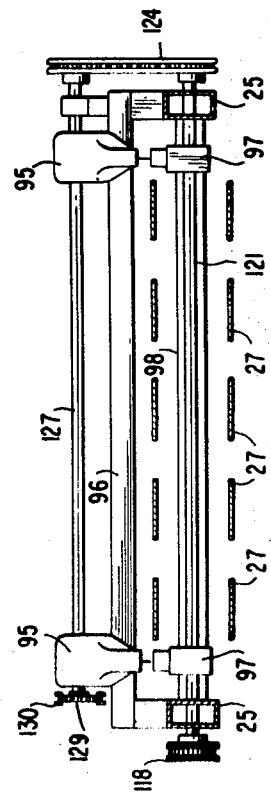
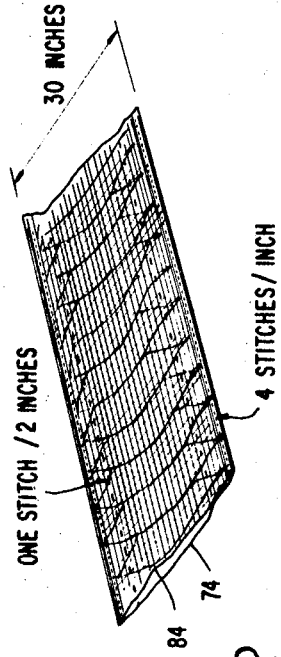
INVENTOR
EMMETT T. CLARK
Shanley & Neil
ATTORNEYS Sept. 21, 1971   E. T. CLARK   3,606,723
METHOD AND APPARATUS FOR HARVESTING AND HANDLING CROPS
Filed April 10, 1969   5 Sheets-Sheet 2
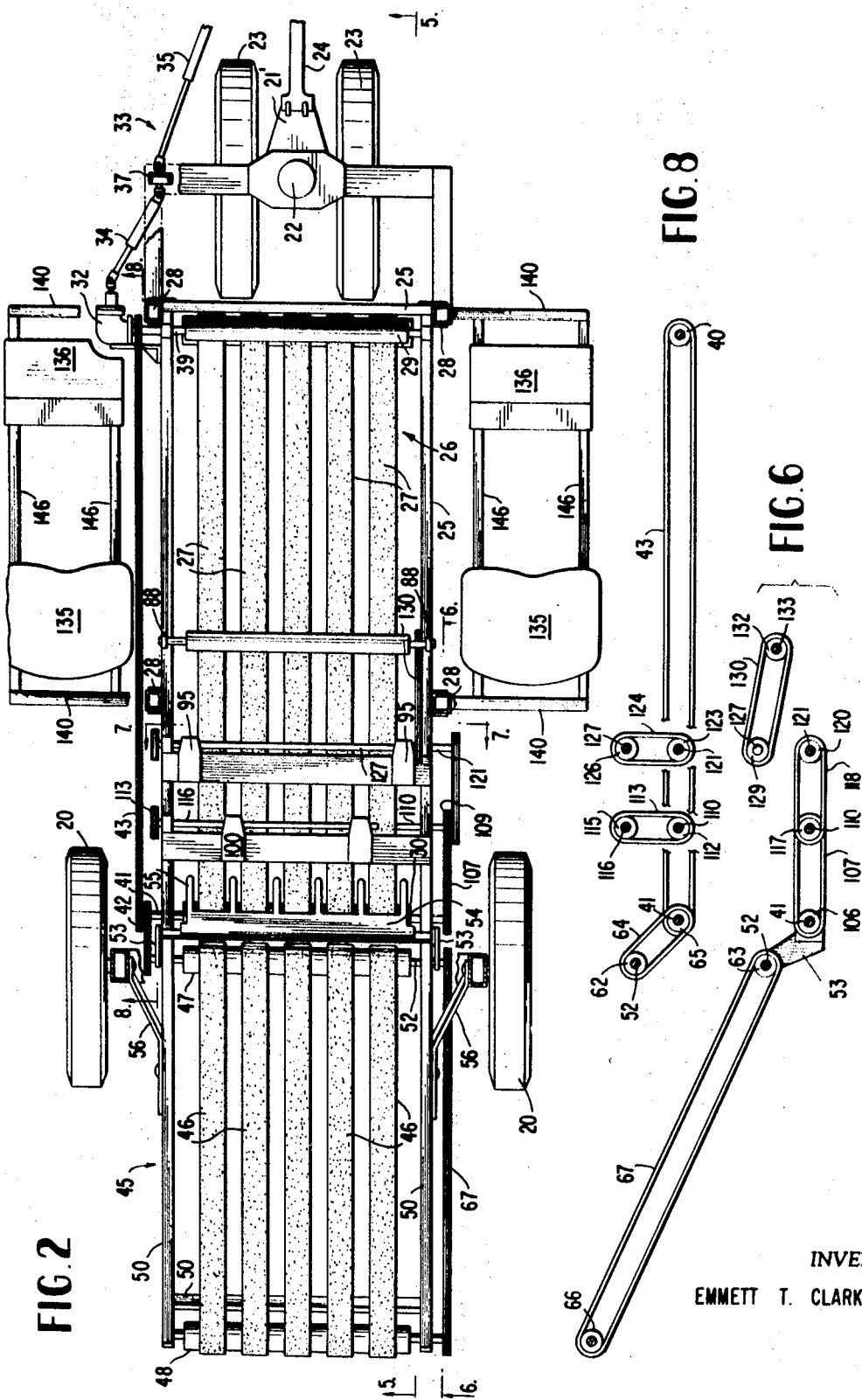
INVENTOR
EMMETT T. CLARK Sept. 21, 1971   E. T. CLARK   3,606,723
METHOD AND APPARATUS FOR HARVESTING AND HANDLING CROPS
Filed April 10, 1969   5 Sheets-Sheet 3

INVENTOR
EMMETT T. CLARK

Sept. 21, 1971     E. T. CLARK     3,606,723

METHOD AND APPARATUS FOR HARVESTING AND HANDLING CROPS

Filed April 10, 1969     5 Sheets-Sheet 4

FIG.5

INVENTOR
EMMETT T. CLARK

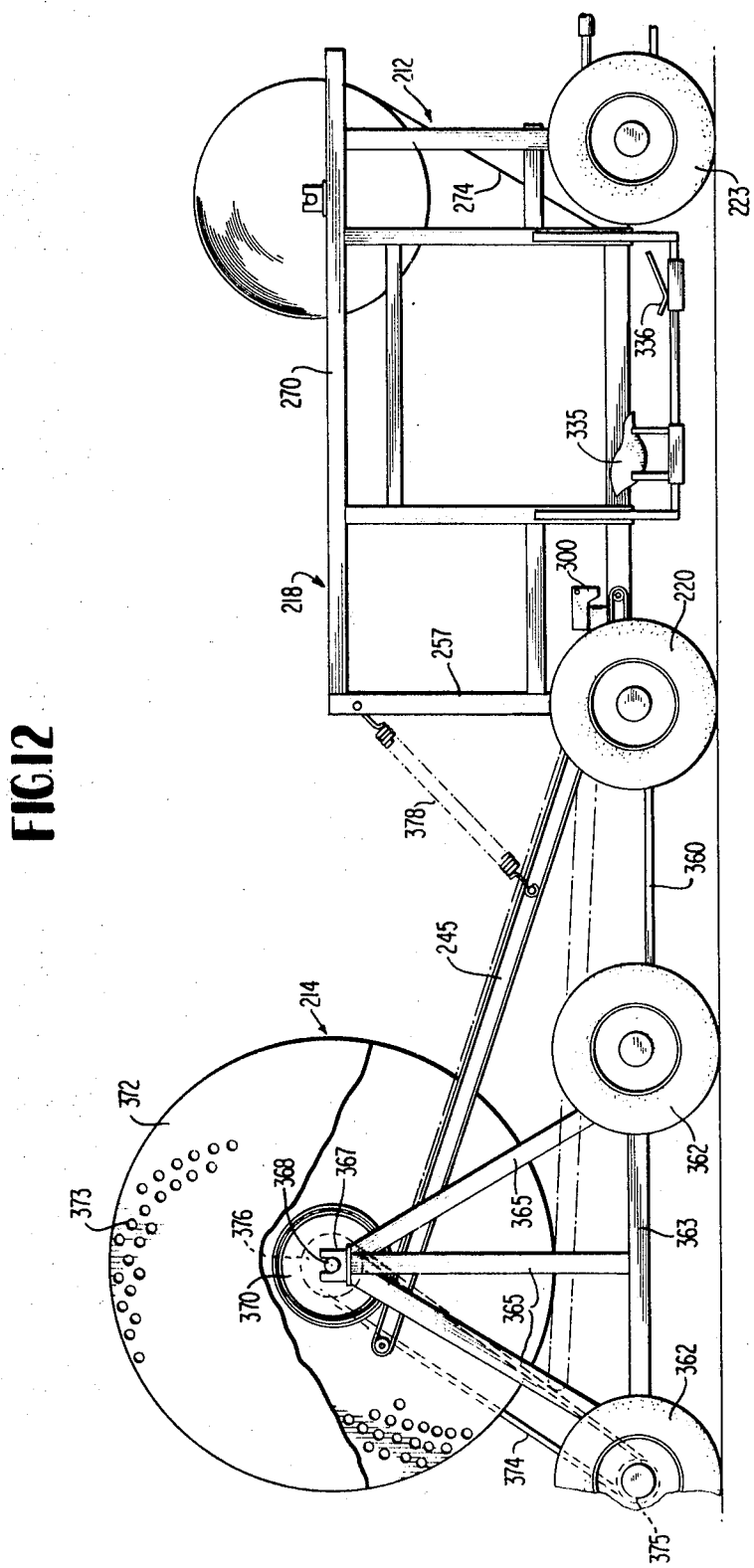

United States Patent Office 3,606,723
Patented Sept. 21, 1971

3,606,723
METHOD AND APPARATUS FOR HARVESTING AND HANDLING CROPS
Emmett T. Clark, Durham, N.C., assignor of a fractional part interest to James J. Shanley, Bethesda, Md.
Continuation-in-part of application Ser. No. 661,641, Aug. 8, 1967, now Patent No. 3,470,882, dated Oct. 7, 1969. This application Apr. 10, 1969, Ser. No. 814,963
Int. Cl. B65d 9/02, 63/04, 67/00
U.S. Cl. 53—21FW
20 Claims

ABSTRACT OF THE DISCLOSURE

A method and apparatus for harvesting leafy crops in which an elongated web means of flexible porous sheet material is moved along past a harvesting station at which harvesters lay harvested crop material on the web means, the harvested crop material is conveyed on the moving web means to a point where the harvested crop material and the web means may be connected together to integrate the two and thereafter the harvested crop material can be handled in conjunction with handling of the web means. The invention also envisages overlaying a second elongated web means of flexible porous sheet material on top of the harvested crop material deposited on the first web means, connecting marginal portions of the first and second web means to envelope the harvested crop material and if desired connecting the first and second web means at spaced points intermediate the longitudinal marginal portions to stabilize the harvested crop material relative to the enveloping web means to facilitate further handling of the harvested crop material. The invention further envisages treating the harvested material in any case by suspending or reeling the elongated web means and the enveloped harvested crop material.

Cross-reference to related application

This is a continuation-in-part application of copending application Ser. No. 661,641, filed Aug. 8, 1967, now Pat. No. 3,470,882.

Background of the invention

A preferred variant of the method and a preferred embodiment of the apparatus of the present invention are described in the environment of tobacco harvesting, handling, curing and shiping although it is applicable to other crop materials.

Prior to the present invention it has been the practice for harvesters of tobacco to move along the rows of tobacco plants removing ripe leaves and handing them up to other workers who are riding along on the platform of a vehicle moving abreast of the pickers. The workers on the platform tie the stems of a bunch or "hand" of tobacco leaves together and then tie this clump of tobacco leaves to a "stick." A plurality of bunches of tobacco leaves are tied along the length of each stick at points spaced from the ends. These sticks are carried by other workers to a tobacco barn where the ends of the sticks are laid on parallel supports in closely spaced relation along the length of the barn. When the barn is full, sources of heat are introduced and the tobacco is cured. When the tobacco is "cured out" the barn is opened up to permit the tobacco to "come back," i.e., absorb atmospheric moisture. The cured tobacco can then be handled and transported to aging facilities and eventually to tobacco product manufacturing plants.

It will be obvious that this prior art process of harvesting and handling tobacco requires a great deal of manual labor.

It has already been proposed to reduced the amount of labor involved in tying tobacco to sticks by means of machinery for stringent or stitching the stems of tobacco leaves together with string or forming a string by sewing the stem ends of the leaves to a cloth band or tape so that the tobacco leaves can be hung in the barns on sticks or otherwise with less manual labor. Representative patents disclosing these ideas are Bass Pat. 1,987,844, Dickerson Pat. 2,327,252, Coley et al. Pat. 2,825,474 and Robinson et al. Pat. 3,130, 844. None of the proposals had been accepted in the field.

The present invention would utilize only one or two pickers, a tractor driver for towing the machine and a second tractor driver for replacing loaded trailers of collected web means and tobacco leaves produced by the harvesting machine and towing them to the tobacco barns or in some cases two truck drivers, the last for driving trucks, one at a time along with the harvesting machine to collect web means carrying the tobacco leaves which is produced in the harvesting machine and transporting full truck loads to the barns. The reduction in labor costs is obvious.

As pointed out in the following description of the preferred embodiment of the invention, additional advantages accrue in both the curing and later handling of the tobacco.

Brief description of the drawing

FIG. 1 is a view in side elevation, with parts omitted for convenience, of a preferred embodiment of the apparatus of the present invention which is also suitable for carrying out certain steps of the method of the present invention;

FIG. 2 is a plan view in horizontal section on line 2—2 of FIG. 1 with parts omitted for convenience, of the apparatus of FIG. 1;

FIG. 5 is an enlarged view in section taken on the line 5—5 of FIG. 2;

FIG. 6 is an enlarged fragmentary view in vertical section taken on the line 6—6 of FIG. 2;

FIG. 7 is an enlarged fragmentary view in vertical section taken on the line 7—7 of FIG. 2;

FIG. 8 is a fragmentary view in vertical section taken on the line 8—8 of FIG. 2;

FIG. 9 is a fragmentary view of a portion of an example of product of the apparatus and method showing in phantom the relationship of the parts;

FIG. 12 is a view in side elevation, with parts omitted for convenience, of a modification of the apparatus of the present invention which is also suitable for carrying out certain steps of a variant of the method of the present invention.

Figure 3:
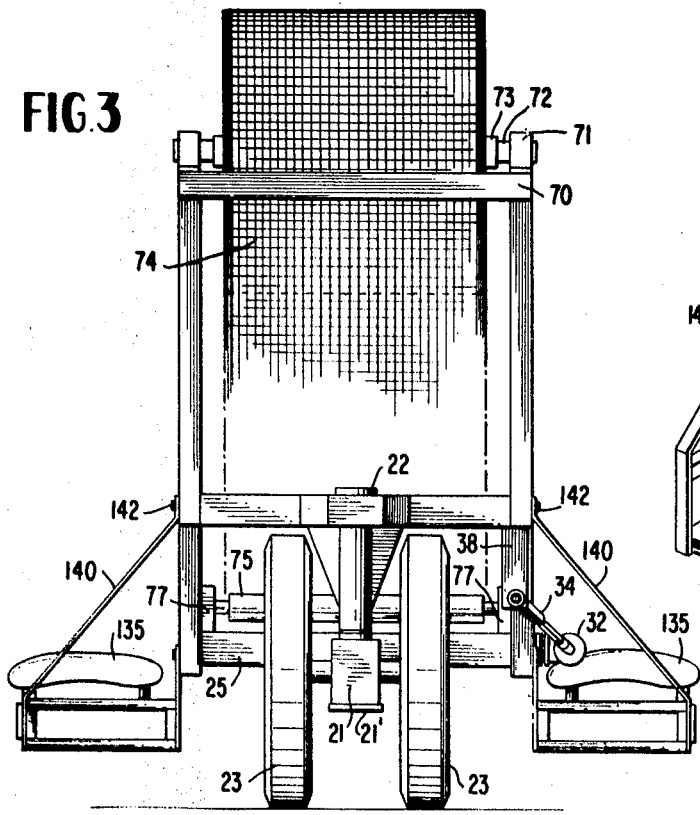
FIG. 3 is a front view in elevation of the apparatus of FIG. 1 with parts omitted for convenience.

Description of preferred embodiments of the present apparatus invention and preferred variants of the present method invention Referring to the drawings, a harvesting maching is indicated generally by reference numeral 12 which can be drawn and powered by a tractor indicated generally by reference numeral 13 and which can have connected behind it a harvested tobacco accumulating trailer indicated generally by the reference numeral 14. Tractor 13 can be a conventional machine with a convention two bar connection 15 and auxiliary power take-off 16.

The harvesting machine 12 comprises a suitable structural framework indicated generally at 18 which is supported at the rear on wheels 20 and at the front on a truck 21 pivoted in the frame at 22 and including a pair of coaxially mounted wheels 23. The vehicle thus formed is drawn and steered by a conventional tongue 24 connected to a projecting portion 21' of truck 21. A rectangular structural frame 25 is supported at the lower end of four vertical structural members 28 of the vehicle framework 18 and carries a belt conveyor indicated generally at 26 made up of a plurality of spaced belts 27 in conjunction with rollers 29 and 30 journaled in frame 25. Belts 27 are maintained in tight frictional engagement with rollers 29 and 30 by belt tightener shown schematically at 31. A belt conveyor 26 is driven through roller 29 by means of a 90° drive gear box 32 connected by a universal joint drive shaft system indicated generally at 33 from power take-off 16 of the tractor. In order to accommodate pivotal movement of the truck 21, drive shaft system 33 includes telescoping portions 34 and 35 with conventional universal joint connections at their ends. An intermediate bearing 37 for the transmission shaft is supported by a depending post 38 carried by the vehicle structural framework. The drive and bearing shaft 39 of conveyor roller 29 which is driven by 90° gear box 31 has keyed to it a sprocket 40 and the bearing and drive shaft 41 of conveyor roller 30 has keyed to it an identically sized sprocket 42. A drive chain 43 interconnects the two sprockets to drive roller 30 at the same speed as roller 29. Vehicle framework 18 also carries a second belt conveyor indicated generally by the reference numeral 45 which involves a plurality of belts 46 carried by conveyor rollers 47 and 48 which in turn are journaled in a vertically swingable rectangular frame 50. The lower end of frame 50 is pivoted on the bearing and drive shaft 52 of roller 47 by means of a pair of structural members 53 carried by frame 25. A deflector guide 54 with fingers 55 extending downwardly between belts 27 is carried by and between structural members 53 to bridge the space between conveyor 26 and conveyor 45. Frame 50 and therefore conveyor 45 can be pivotally adjusted on shaft 52 as to the angle it makes with conevyor 26 and held by means of a pair of arms 56 which are pivotally connected to the rear vertical members 57 of vehicle framework 18 and have their free ends connectable to framework 45 by bolts 58 passing through selected holes of a plurality of bolt holes 59. A belt tensioning device 60 is diagrammatically shown for conveyor 45. The opposite ends of the bearing shaft 52 of roller 47 each carry a sprocket 62 and 63, respectively, identical to sprocket 42. (See FIGS. 6 and 8.) Sprocket 62 is connected by a drive chain 64 with another identical sprocket 65 carried by shaft 41 of conveyor 26 so that roller 47 of conveyor 45 is driven at the same speed as roller 30 of conveyor 26. Roller 48 of conveyor 45 has on one end of its bearing shaft a sprocket 66 identical in size with sprocket 63 and a drive chain 67 connects the two sprockets so that roller 48 is driven at the same speed as roller 47. Since conveyor 45 pivots on the axis of bearing and drive shaft 52 vertical swinging movement of conveyor 45 will not result in a difference in distance between the centers of sprockets 52 and 65.

The upper portion of vehicle framework 18 carries a rectangular structural frame 70 which in the forward portion of the machine carries a pair of coaxially disposed bearing chocks 71 which removably support a shaft 72 on which is rotatably mounted a cylindrical core 73 carrying a roll of foraminous or porous, flexible sheet material 74, such as open weave webbing, cheesecloth, netting or the like. Carried at the lower forward portion of the vehicle framework 18 is a vertically movable, freely turning roll 75 of appreciable weight, the bearing shafts of which ride in a vertically elongated slot 76 in stub column 77 rigidly attached to the framework. Roller 75 may be manually or otherwise lifted vertically to the position shown in FIG. 5 to permit web 74 to be passed under it. When released the weight of roll 75 presses web 74 against the conveyor belts 27 with sufficient force to draw web 74 off the roll. Conveyor 26 will carry web 74 along and fingers 55 on guide 54 which project down between belts 27 will divert and guide web 74 onto conveyor 45.

In the preferred embodiment of the present invention frame 70 also carries a second pair of coaxially aligned bearing chocks 80 which removably support a shaft 81 on which is rotatably supported the cylindrical core 82 of a second roll of foraminous or porous, flexible sheet material 84 which can be identical in construction with web 74. Web 84 passes under a freely turning roll 85 which is rotatably mounted in vertical slots 86 of brackets 88 carried by frame 25. Mounted below roll 85 is a roll 91 having fixed bearings at each end in brackets 88, roll 91 being driven at a peripheral speed equal to (or very slightly greater than) that of the driving rollers 29 and 30 of conveyor 26 and conveyor belts 27. This may be accomplished by means of sprockets and chain drive synchronized with the drive of conveyor 26, as will be described below. The diameter of roll 91 will be dimensioned to give the desired peripheral speed. As in the case of web 74, roll 85 can be manually or otherwise moved upwardly to thread web 84 between rolls 85 and 91. The weight of roll 85 when lowered will then cause roll 91 to take web 84 off its roll and feed it into an overlying position in respect to web 74. Since crop material will have been deposited on web 74 before web 74 reaches conjunction with web 84, web 84 will overlie the harvested crop material. It is desirable to have the marginal portions of both webs coincide for connection together and therefore web 84 may be slightly greater in width to accommodate the thickness of a layer of crop material riding on web 74. Since, as will be explained below, the webs are joined together in the machine, their respective linear movements should be synchronous but if this is not always practicable, web 84 can be moved at a very slightly higher speed, the weight of the harvested crop material on web 74 making it undesirable to slow that web down appreciably, a slight excess of web 84 overlying web 74 causing no undesirable effect. This slightly higher speed can be considered for all practical purposes as substantially the same speed since too great a difference in the speeds of the webs would serve no useful purpose.

Where the two webs 74 and 84 are utilized, the present invention contemplates connecting both marginal portions of both webs together to form a continuous envelope enclosing the harvested crop material being carried along by conveyor 26. For this purpose a pair of sewing machine heads or equivalent devices 95 are mounted on a transverse structural member 96 carried on top of the lower rectangular frame 25 and a pair of associated looping or equivalent devices 97 are carried on a transverse structural member 98 carried between the side rails of structural frame 25. Since these sewing machines or their equivalent form no part of the present invention they will not be disclosed in detail, any suitable stitching device, preferably for double chain stitching, being satisfactory for the purpose of the present invention. The stitching devices 95, 97 are driven from the drive shaft of roll 30 by a sprocket and gear system to be described. These stitching devices preferably connect the two marginal portions of webs 74 and 84, preferably with closely spaced stitches of double chain stitching, to hold the associated marginal portions of the two webs together.

Where the two webs 74 and 84 of the present invention are utilized, it will normally be desirable to stabilize the harvested crop material which is enclosed between the two webs against unrestricted movement of the crop material relative to the two webs while leaving the surfaces of the crop material accessible to the free passage of air over them during curing. For this purpose one or more sewing machine heads or equivalent devices 100 are supported by a transverse structural member 101 which in turn is carried on structural frame 25 and associated looper or equivalent devices 103 are carried by a transverse structural member 104 supported between the side rails of structural frame 25. Again the stitching device or devices 100, 103 can be conventional.

Where only one web is used in the method of the present invention, the stitching devices 100, 103 only are used and they connect the tobacco leaves and the web 74 together with the stitches passing through the leaf material adjacent the stem ends of the leaves and through the leaves near the tips thereof. Normally it will be necessary for the stitching passing through the leaves adjacent the stem ends to be adequate as the primary means for holding the leaves firmly on the web 74 during subsequent handling. Preferably the stitching adjacent the tip ends of the leaves is considerably looser with greater spacing between stitches so as to permit the leaves by their natural resilience to be spaced apart for accessibility of air to their surfaces during curing. Of course, the surfaces of the leaves at the stem ends in this variant of the method should also be accessible to the passage of air during curing and the stitching and although closer and tighter than that adjacent the tips will be designed to achieve this end.

In the preferred embodiment of the apparatus of the present invention and the preferred variant of the method both webs 74 and 84 are used and one stitching devices 100, 103 or possibly both stitching devices 100, 103 desirably secure the two webs and the harvested crop material loosely together by stitches with considerably greater spacing than machines 95, for example linearly, one stitch in two inches and with the stitches permitting the webs to be spaced apart as much as two or three inches at the stitches by the loosely deposited harvested crop material. In some situations, such as in tobacco harvesting, with the stems of the tobacco leaves deposited on web 27 being all pointed in the downward direction in FIG. 2, and to the right in FIG. 9, only the single lower stitching device 100, 103 in FIG. 2 need be utilized. With web 74 thirty inches in width the spacing of each stitching device 100, 103 from the associated margin of web 74 can favorably be about six to nine inches and the proximity of the two webs to each other along the line of stitching can vary considerably but is such that the stitching firmly holds the tobacco leaves, despite their spaced surfaces, in stabilized position between the two webs, that is, against appreciable slippage along the length of the web, during further handling of the crop material.

As will be evident from FIGS. 2, 6 and 8, stitching devices 100, 103, stitching devices 95, 97 and web 84 drive roll 91 are driven by sprockets and chains with the initial sprocket being sprocket 106 on drive shaft 41 of roll 30 of conveyor 26. A driving chain 107 connects this sprocket with a sprocket 109 which drives a shaft 110 which in turn drives loopers 103. On the other end of shaft 110 is a sprocket 112 which by means of drive chain 113 drives the sprocket 115 which in turn actuates a shaft 116 which operates stitching devices 100. Shaft 110 carries a second sprocket 117 which through the medium of a drive chain 118 drives the sprocket 120 which in turn drives a shaft 121 for actuating loopers 97. On its other end shaft 121 carries a sprocket 123 which through a drive chain 124 drives the sprocket 126 which in turn actuates a shaft 127 for operating stitching devices 95. The other end of shaft 127 carries a sprocket 129 (see FIG. 7) which by means of drive chain 130 drives the sprocket 132 which in turn drives the shaft 133 which is the drive shaft for roll 91, the driving roll for web 84. Where synchronous speeds are desired the sprockets are the same sizes. Where higher or lower speeds are desirable, as the case of the stitching devices and their associated loopers, the sizes of the driving and driven sprockets can be different.

The conveyor 26 will move relatively slowly and the needles of the stitching devices will move relatively rapidly so that the web stopping action of the needles can be accommodated by a slight "give" of the web on the conveyor belts.

Figure 10:
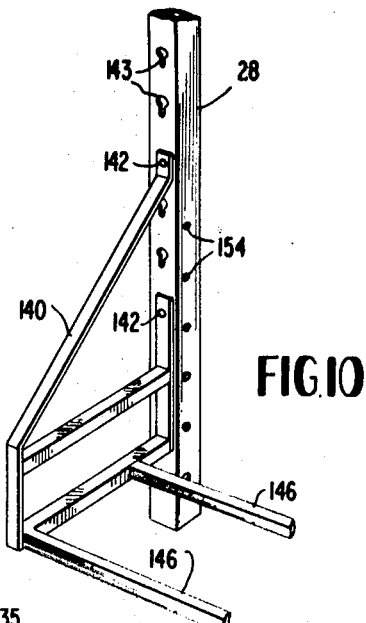
FIG. 10 is an enlarged fragmentary detailed view of a part of the apparatus.
Figure 4:
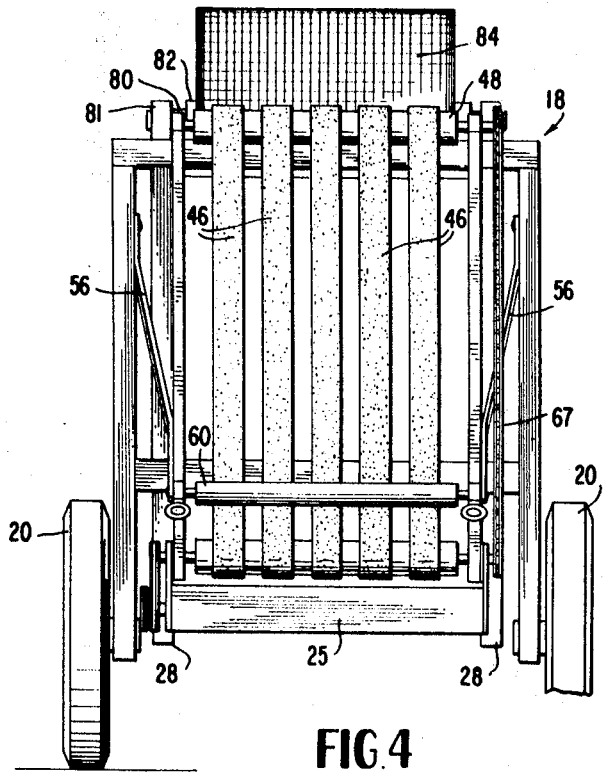
FIG. 4 is a rear view in side elevation of the apparatus of FIG. 1 with parts omitted for convenience.

In operation of the harvesting machine in the field the tractor 13 tows the harvesting machine 12 along rows of tobacco plants and pickers can walk along beside the machine picking ripe tobacco leaves and depositing them on web 74. Where desirable these pickers can be carried along by the machine instead of walking and for this purpose seats 135 and foot rests 136 are shown on each side of the harvesting machine. As illustrated in FIG. 10, these seats and foot rests are vertically adjustable on upright support members 28 of vehicle framework 18 by virtue of the seat and foot rest supporting framework 140 incorporating headed bolts 142 receivable in selected slots 143. Seats 135 and foot rests 136 are selectively, longitudinally adjustable on rails 146 of framework 140 by means of telescoping tubular members 148 which can hold each seat or foot rest in a desirable position by any suitable clamping means.

Figure 11:
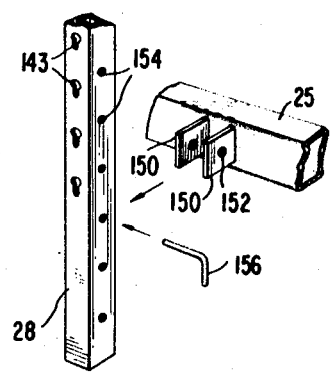
FIG. 11 is another enlarged fragmentary detailed view of a portion of the apparatus.

Structural frame 25, conveyor 26 and associated structure, including supporting member 53 and conveyor 45, constitute a unitary structure supported by vehicle framework 18 for vertical adjustment so that conveyor 25 can be set at the optimum height above the ground under conditions in the field. This is made possible by the adjustable means illustrated in FIG. 11 which illustrates an adjustable connection between structural frame 25 and vertical frame members 28 of vehicle framework 18. Each side rail of frame 25 carries two pairs of ears 150 for cooperation with each of the four vertical structural members 28. For adjustably connecting the structural frame 25 to the vertical structural member 28, each pair of ears has aligned holes and each vertical structural member 28 has a plurality of vertically spaced aligned holes 154. With ears 150 being spaced so as to embrace vertical structural member 28 and with the holes 152 in the ears 50 aligned with a pair of holes 154 in the vertical structural member 28, pin 156 is passed through all four holes. with this done in respect to each of the set of ears 150 and vertical structural members 28 at the same level the table will be locked at that elevation. Of course to change the elevation the four pins are removed and the four sets of ears are aligned with higher or lower pairs of holes on the four vertical posts.

The harvesting machine of the present invention can be followed in the field by any means for accumulating netting crop material, a vehicle being preferable so that when loaded the connection with the machine 12 can be severed and the accumulated crop material transported to a tobacco barn. One form of preferred vehicle indicated generally by reference numeral 14 is a trailer which can be connected to the harvesting machine 12 by means of a detachable tow bar 160. The illustrated form of tractor rides on four wheels 162, the leading two wheels being in pivoted truck form similar to those of the harvesting machine for steering purposes. A chassis 163 carries a structural framework 165 which supports a pair of aligned shaft bearing chocks 167. Shaft 168 is removably supported in chocks 167 and a rotatable mandrel or core 170 is carried by shaft 168. The netted tobacco leaves held between the two webs 74 and 84 or integrated with a single web 74 are reeled onto mandrel 170 in any desirable manner, i.e., by power or by hand.

It is believed that the operation of the harvesting machine of the present invention will be obvious from the foregoing description. The method of the present invention in conjunction with which the harvesting machine may be used will now be described. As will be evident from the foregoing description, applicant's invention, in the specific variant involving the harvesting of tobacco, involves laying the ripe leaves on a moving web of material which is strong enough to hold the tobacco during handling, hanging in the tobacco barn and in some cases shipment while at the same time being extremely porous, foraminous or reticulated so as to allow air to get at the tobacco integrated with or enclosed within this material and at the same time to cut down the amount of textile material involved and therefore reduce the cost. A representative strip of this material could be thirty inches wide with marginal portions which are closely woven to receive the stitching from machines 95, 97 and with the material between the marginal portions being of extremely open mesh with as great as one inch square or two inch square openings. Since the cost of this material will be an appreciable item, it is contemplated that, where it is not used in shipment, it can be salvaged after the tobacco is cured and the salvaged web reused in the process. This could be facilitated by the use of chain stitching along the margins and intermediate the margins where practicable so that by pulling one string or thread the entire line of stitching will unravel.

When the tobacco leaves have been deposited on the moving web by the picker, with two pickers and the harvesting machine moving slowly down between two rows of tobacco, with the tobacco leaves arranged transversely of the longitudinal dimension of the webbing and the stems pointing in the same direction, the tobacco leaves can be integrated with the single webbing by a row of stitches passing through the tobacco leaves at the stem ends, i.e., through some of the leaf adjacent the stem while at the same time a looser stitching operation takes place along the other side of the webbing near the tips of the leaves. Especially in respect to the latter row of stitching, the stitches are made as loose and as far apart as practicable so that when the tobacco is being cured air can get in between the leaves. In the curing operation the leaves will shrink but this will merely cause puckering of the webbing material without affecting the efficacy of the method. It is also conceivable that intermediate lines of extremely loose stitching can be used to integrate the leaves and the webbing and this may be desirable to assure that the tobacco leaves will not become disengaged from the webbing during curing and start a fire in a tobacco barn.

Due to the many advantages inherent in the web enclosing method of the present invention it is preferred. As will be evident from the foregoing, in this variant of the method the marginal portions of the webbing are connected tightly together by close stitching machines 95, 97 after the second web 84 has been laid over the tobacco leaves which are being carried along on web 74. With both ends of the resulting envelope securely connected, only one line of stitching appears to be necessary to stabilize the tobacco leaves in the envelope, the enclosing action of the webs or netting assuring that no tobacco leaves can drop during the curing process and start a tobacco barn fire. Even though the single line of stitching intermediate the marginal portions of the webs is of a loose nature and passes through an appreciable thickness of tobacco leaves, perhaps two inches thick, this single line of attachment in conjunction with the enclosing supporting action of the envelope of web material is sufficient to maintain the tobacco leaves against unrestricted movement relative to the webbing. Leaving the remainder of the tobacco leaves unconnected by lines of stitching permits these leaves to remain spaced from one another by their natural shape for circulation of air during curing. It will be noted that the combination of the line of loose stitching intermediate the marginal portions of the envelope and the restraining action of the envelope itself results in the leaves being securely held during and after the curing process despite the tremendous shrinkage in the leaf structure. Actually in prior art practice, shrinkage of the stems during the curing has resulted in considerable difficulties where the tobacco leaves have been tied at the stems and supported in this manner.

As pointed out above, whether the leaves are integrated with one continuous web (closely held against the web near the stem ends) or whether they are stabilized (loosely held against unrestricted movement relative to the web material) as preferred in a continuous envelope of webbing, this continuously moving combination of web and tobacco leaves is carried away from the stitching stations by conveyor 45 or any other suitable means to a vehicle following the harvesting machine where this product is accumulated. In the method of this invention, this vehicle following can be in the nature of a truck in which the continuous web and associated tobacco leaves are laid down in folded lengths until several hundred feet have accumulated and a satisfactory truckload has been reached; or, as described above, this continuous web and associated tobacco leaves can be accumulated on a reel carried by a vehicle until a large diameter roll, as great as eight or more feet in diameter, has been built up. In either case the web is severed, the loaded vehicle directed toward the tobacco barns and a new empty vehicle moved into place behind the harvesting machine to start accumulating another load of the web and associated tobacco.

When the load of web and associated tobacco reaches the tobacco barn, the web and associated tobacco is preferably suspended in the barn by the edge of the web contiguous to the tobacco stems with the tips of the leaves depending downwardly. The continuous web and associated tobacco leaves can be suspended in the barn in any suitable manner, as by wire hooks in zig-zag or other suitable configuration spanning the space between the poles in the tobacco barn. Suitable lengths of web and associated tobacco can be 300 and more feet long and the vehicle following the harvesting machine should be large enough to accumulate this much product.

Where desirable, a double width of web means can be passed through the process with the tobacco leaves laid on one-half the web, the other half of the web means being then folded over the tobacco leaves so that only one line of marginal stitching is needed to form the envelope.

In respect to both the preceding paragraphs, the line of connection of the margin of the web on the upper side of the envelope formed by the web can be omitted since the hanging hooks will hold these margins together to envelope the tobacco. In such cases and other situations where the upper line of stitching is omitted the web envelopes rather than encloses the tobacco.

Instead of collecting a continuous envelope of the netted tobacco after the continuous envelope has been formed by the connecting step of means 95, 97 and the connecting step of means 100, 103, the continuous envelope and enclosed tobacco can be sheared into discrete lengths suitable for hanging in a tobacco barn. In such case, spaced parallel lines of stitching may, if needed, be formed transversely of the envelope following, or in lieu of, the connecting step of means 100, 103, with the line of shearing being then made between the spaced lines of stitching. In this manner, packages of the tobacco leaves in the form of individual envelopes of the desired length closed at both ends can be obtained. After curing, the tobacco in such envelopes can be shipped to a tobacco production facility. The present invention also contemplates curing the tobacco in the envelopes of great length, as already described, and then forming the smaller packages or envelopes of cured tobacco for shipping purposes. In this way, repeated handling of the individual tobacco leaves which results in considerable breakage and loss would be avoided and at the same time any broken fragments of the cured tobacco leaves within the packages would be retained.

Although stitching has been disclosed as the connecting means of the specific embodiments of the apparatus of the present invention and the connecting step of the specific variant of the method in respect to uniting the marginal portions of the continuous envelope, it will be obvious that the two webs may be formed of foraminous sheet material with contact adhesive on the opposing faces of the mating marginal portions of the two webs, so that any suitable means for continuously pressing the marginal portions together can be substituted for each of the elements 95, 97.

Referring now to FIG. 12, a modification of the invention is disclosed for harvesting the tobacco leaves in conjunction with the use of a single web, the single web with tobacco leaves on the top side thereof being collected on a reel in such a manner that the web wraps around and hold the tobacco leaves as each convolution of web and tobacco leaves is built up on the reel. It will be apparent that in this modification of the apparatus and variant of the method, the tobacco leaves need not necessarily be connected to the web at all.

In FIG. 12, except where indicated, the apparatus is similar to that of FIG. 1 and where applicable the reference numerals in FIG. 12 correspond to those in FIG. 1 with 200 being added in each instance. Since only a single web is used with the apparatus of FIG. 12, many of the components of FIG. 1 can be omitted such as the feed reel for web 84, the handling means for web 84 and sewing machines 95, 95 for joining the margins of web 84 to web 74. At least one sewing machine 300 is arranged at the stem end side of web 274 in case it is desirable to connect the tobacco leaves to webs 274 by sewing as already described in connection with the modification of FIGS. 1–11 inclusive.

The extremities of mandrel or core 370 may carry side flanges indicated at 372 (portions of the one on the side toward the observer being omitted in this showing for purposes of simplification) for guiding successive convolutions of the web carrying the tobacco leaves. The reel formed by side flanges 372 and core 370 can be driven by a belt connection 374 connected to a pulley 375 on wheel 362 and can be connected through any suitable slip clutch 376 to core 370, the slip clutch being adjustable to place the desired tension on the convolutions of the web and tobacco leaves as they are wound on the reel.

In this embodiment conveyor 245 passes below core 370 with conveyor supporting spring 378 urging the conveyor into engagement with the underside of the web in each of the convolutions of tobacco leaves and web as they accumulate. In this way, the two sides of the single web enclose the tobacco leaves of each convolution as the coil of harvested product builds up.

Applicant contemplates curing the tobacco on the reel in some situations and therefore the arrangement and method illustrated in FIG. 12 results in a large body of tobacco leaves arranged in convolutions, with each convolution separated by a single web. In such case, by forming the side flanges 372 of the reel of foraminous or reticulated material 373, a curing atmosphere entering through the openings of one flange 372 can have access to the tobacco leaves, passing through the open ends of the convolutions and out through the openings of the other flange. Long tension springs around the coil can be used to compensate for shrinkage of the tobacco leaves during curing and hold the tobacco leaves in position within the coil.

To distinguish between the primary connection, which is the function of the stitching through the leaf material at the stem ends where only one web is used, and the relatively loose, positioning function of the stitching through the leaf material at the stem ends of the leaves where two webs are used, the term integrate has been used to designate the former method of attachment and the word stabilize used to designate the latter method of attachment, with the generic term connect being used to embrace both.

Although the present invention has been described and illustrated in connection with preferred embodiments and variants, it is to be understood that modifications and variations may be resorted to without departing from the spirit of the invention, as those skilled in this art will readily understand. Such modifications and variations are considered to be within the purview and scope of the present invention as defined by the appended claims.

I claim:
1. A method of harvesting crops comprising:
   (a) moving a continuous first web means of flexible material, having a marginal portion, linearly and also along the direction of a row of the crop material,
   (b) harvesting crop material and depositing harvested crop material on a portion of the moving continuous web means intermediate the marginal portion of the continuous web means and a longitudinal portion of the continuous web means spaced from and parallel to the marginal portion,
   (c) continuously overlaying a second continuous web means of flexible material, having a second marginal portion and a second longitudinal portion spaced from and parallel to the second marginal portion, over the crop material on the intermediate portion of the first continuous web means with the second marginal portion of the second continuous web means contiguous to the marginal portion of the first continuous web means and with the longitudinal portion of the first continuous web means connected to the second longitudinal portion to envelope the crop material,
   (d) after step (b) and prior to step (e) connecting web means and crop material together at closely spaced points disposed along the length of said web means intermediate the marginal and longitudinal portions of said web means, and
   (e) collecting connected together web means and enveloped harvested crop material for treatment, storage or transportation.

2. The method of claim 1 in which the first and second web means are integral.

3. The method of claim 1 in which the first and second web means are separate web means and said longitudinal portion of each web means is contiguous to that of the other web means and a contiguous longitudinal portion of one web means is connected to the contiguous longitudinal portion of the other web means in step (c).

4. The method of claim 3 in which the contiguous longitudinal portions and the contiguous marginal portions of both webs are respectively connected together.

5. The method of claim 1 which includes the steps of transporting collected web means and enveloped harvested crop material to a treating point, and suspending web means and enveloped harvested crop material by the web means during treatment at the treating point.

6. The method of claim 7 which includes the steps of transporting collected continuous lengths of web means and enveloped harvested crop material to a treating point, treating the harvested crop material while held in the continuous web means and then after treatment transversely severing continuous web means at a plurality of predetermined locations along the length of the continuous web means to form discrete packages of the treated crop material for further handling of the treated crop material.

7. The method of claim 1 in which continuous lengths of the continuous web means and enveloped crop material are collected in step (e).

8. The method of claim 7 in which the collecting step includes the step of reeling continuous lengths of the continuous web means and enveloped crop material on a reel means for storage, treatment or transportation.

9. The method of claim 7 which includes subsequently to steps (c) and (d) transversely severing continuous web means and enveloped harvested crop material at a plurality of predetermined locations along the length of the continuous web means to form discrete packages of harvested crop material for treatment, storage or transportation.

10. The method of claim 9 in which the two web means are connected by a double row or stitching which is made transversely to the length of the continuous web means on either side of each transverse line of severance not later than the time at which the web means is severed.

11
11. A method of harvesting crops comprising:
(a) moving a continuous web means of flexible sheet material, having longitudinal marginal portions, linearly and also along the direction of a row of the crop material,
(b) harvesting crop material and depositing harvested crop material on the topside of the moving continuous web means between one longitudinal marginal portion and a spaced parallel longitudinal portion,
(c) carrying the deposited crop material along on the moving continuous web means to a collecting reel means, and
(d) reeling the moving continuous web means and deposited crop material carried thereby on the collecting reel means in convolutions with the moving web means in each convolution holding the crop material deposited on the topside thereof against the bottomside of the preceding convolution of moving web means whereby pressure is exerted on the crop material to hold the crop material against movement relative to the continuous web means in successive convolutions on the reeling means.

12. The method of claim 11 in which the moving continuous web means and the deposited crop material are connected together at closely spaced points along a linearly extending line intermediate said longitudinal portions prior to reeling the moving continuous web means on the collecting reel means.

13. Crop harvesting apparatus comprising:
(a) conveyance means constructed for movement along rows of crop material in a field in the direction the rows of crop material extend,
(b) means for supplying continuous web means of flexible sheet material having longitudinal marginal portions,
(c) conveyor means carried by the conveyance means for supporting the continuous web means while moving the continuous web means linearly of the length of the web means,
(d) means associated with the conveyance means for feeding the continuous web means from means (b) to means (c) with a large area of one surface of the continuous web means facing upwardly and arranged to receive crop material laid on the web means between at least one longitudinal marginal portion and a spaced parallel longitudinal portion,
(e) conveyor means forming part of conveyor means (c) and located at a point following means (d) in the direction of movement of the continuous web means for supporting the moving continuous web means and harvested crop material deposited on the upwardly facing surface of the moving web means at that point from a picker moving along adjacent the conveyance means,
(f) conveyor means forming another part of conveyor means (c) for moving the continuous web means carrying the harvested crop material to a web and harvested crop material collecting point for treatment, storage or transportation,
(g) reeling means at the crop material collecting point arranged to receive the continuous web means and harvested crop material in successive convolutions on the reeling means, and
(h) means included in means (f) for conveying the continuous web means and harvested crop material to the reeling means with said upwardly facing surface of the continuous web means and the crop material carried thereby in opposed relation to the bottom surface of the preceding convolution of continuous web means on the reeling means whereby pressure is exerted on the crop material to hold the crop material against movement relative to the continuous web means in successive convolutions on the reeling means.

12
14. Crop harvesting apparatus as claimed in claim 13 including
(i) means carried by the conveyance means following means (e) in the direction of movement of the web means for connecting the continuous web means and the crop material together at closely spaced points disposed along the length of the web means and intermediate the longitudinal marginal portions.

15. Crop harvesting apparatus comprising:
(a) conveyance means constructed for movement along rows of crop material in a field in the direction the rows of crop material extend,
(b) means for supplying continuous web means of flexible sheet material having longitudinal marginal portions,
(c) conveyor means carried by the conveyance means for supporting the continuous web means while moving the continuous web means linearly of the length of the web means,
(d) means associated with the conveyance means for feeding the continuous web means to means (c) with a large area of one surface of the continuous web means facing upwardly and arranged to receive crop material laid on the continuous web means between the longitudinal marginal portions,
(e) conveyor means forming part of conveyor means (c) and located at a point following means (d) in the direction of movement of the continuous web means for supporting the moving continuous web means and harvested crop material deposited on the upwardly facing surface of the moving continuous web means at that point from a picker moving along adjacent the conveyance means,
(f) conveyor means forming another part of conveyor means (c) supporting the moving continuous web means and harvested crop material deposited thereon while moving the continuous web means and the harvested crop material to a continuous web means and harvested crop material collecting point for treatment, storage or transportation,
(g) means carried by the conveyance means following means (e) in the direction of movement of the continuous web means for connecting the web means and the crop material together at closely spaced points disposed along the length of said web means and intermediate the longitudinal marginal portions,
(h) means following means (e) in the direction of movement of the continuous web means means for moving a second continuous web means of flexible material, having longitudinal marginal portions, parallel to and at substantially the same speed as the first continuous web means and in overlying relation to the first continuous web means and the crop material thereon with the longitudinal marginal portion of the second continuous web means contiguous to the longitudinal marginal portions of the first continuous web means, and
(i) means following means (h) in respect to movement of the continuous web means for continuously connecting together at least two contiguous longitudinal marginal portions of the first and second continuous web means to envelope the harvested crop material.

16. The crop harvesting apparatus as claimed in claim 15 in which means (i) connects together the contiguous longitudinal marginal portions of the first and second web means on both sides of the harvested crop material to enclose the harvested crop material.

17. The crop harvesting apparatus claimed in claim 15 in which means (i) comprise stitching means.

18. The crop harvesting apparatus claimed in claim 15 in which means (g) comprise stitching means.

19. The crop harvesting apparatus claimed in claim 16 in which means (g) comprise stitching means.

20. The crop harvesting apparatus claimed in claim 16 in which means (i) comprise stitching means.

(References on following page)

References Cited

UNITED STATES PATENTS

| | | | |
|---|---|---|---|
| 1,588,649 | 6/1926 | Bates | 53—139X |
| 2,194,451 | 3/1940 | Soubier | 53—177X |
| 2,213,602 | 9/1940 | Yates | 53—179X |
| 2,224,753 | 12/1940 | Yates | 53—139X |
| 2,340,260 | 1/1944 | Clunan | 53—28 |
| 2,438,089 | 3/1948 | Carson | 53—28X |
| 2,468,517 | 4/1949 | Salfisberg | 53—179X |
| 2,518,965 | 8/1950 | Whitley | 214—5.5 |
| 2,525,651 | 10/1950 | Clunan | 53—28 |
| 2,653,429 | 9/1953 | Fitzgerald | 53—177X |
| 2,704,158 | 3/1955 | Long | 214—5.5 |
| 2,891,658 | 6/1959 | Long | 214—5.5X |
| 2,940,615 | 6/1960 | Long | 214—5.5 |
| 3,053,026 | 9/1962 | Chapin | 53—179 |
| 3,097,464 | 7/1963 | Reeves | 53—391X |
| 3,289,386 | 12/1966 | Farmer | 53—28 |
| 3,458,965 | 8/1969 | Shuffrey | 53—21 |
| 3,468,096 | 9/1969 | Franz | 53—28 |
| 776,246 | 11/1904 | Kanst | 53—111 |
| 3,066,814 | 12/1962 | Christiansen | 214—39 |
| 3,523,404 | 8/1970 | Girardi | 53—391 |
| 3,528,230 | 9/1970 | Simpson | 56—14 |
| 2,379,371 | 6/1945 | Moschel | 56—1 |
| 2,825,474 | 3/1958 | Coley | 214—5.5 |
| 3,470,669 | 10/1969 | Chancellor | 53—21 |
| 3,507,103 | 4/1970 | Pickett | 56—27.5 |

WAYNE A. MORSE, Primary Examiner

U.S. Cl. X.R.

53—21FC, 28, 116, 177, 391; 56—27.5; 214—5.5